Jan. 28, 1969 W. DOMBACHER 3,424,871

CONSTANT-VOLTAGE SUPPLY FOR ELECTRONIC EQUIPMENT IN BATTERY-OPERATED RECORDING OR PLAYBACK APPARATUS

Filed May 7, 1965

INVENTOR.

WOLF DOMBACHER

BY

AGENT

United States Patent Office
3,424,871
Patented Jan. 28, 1969

3,424,871

CONSTANT-VOLTAGE SUPPLY FOR ELECTRONIC EQUIPMENT IN BATTERY-OPERATED RECORDING OR PLAYBACK APPARATUS

Wolf Dombacher, Vienna, Austria, assignor to North American Philips Company, Inc., New York, N.Y., a corporation of Delaware Filed May 7, 1965, Ser. No. 454,100
Claims priority, application Austria, May 15, 1964, A 4,275/64
U.S. Cl. 179—100.2 4 Claims
Int. Cl. G11b 5/00

ABSTRACT OF THE DISCLOSURE

The invention is a voltage stabilizing device for the electronic equipment associated with battery operated record and playback apparatus. The substantially constant back EMF generated across the rotor winding of a constant speed DC motor is filtered and fed to the electronic apparatus.

This invention relates to battery-operated recording and/or playback apparatus, it relates in particular to means for supplying voltage to electronic equipment in such apparatus, the voltage supplied being substantially constant and independent of fluctuations in the battery voltage.

The electronic equipment (amplifiers, oscillators and the like) in battery-operated recording or playback apparatus operate optimally with supply voltages which vary as little as possible since variations in supply voltage produce variations in the electrical properties of the various electronic devices. Usually, the electronic equipment and associated circuits are designed so that variations of up to 50% in the supply voltage are acceptable; this generally permits utilization of the battery as long as possible. In order to tolerate these permissible variations, stabilization circuits for the supply voltage are generally employed, the stabilization circuits generally including voltage stabilizing elements such as Zener diodes. However, stabilization circuits add substantially to the cost of the apparatus.

A primary object of the invention is to provide an efficient and economical manner for supplying substantially constant voltage to the electronic equipment in battery-operated recording and/or playback apparatus.

Another object of the invention is to provide means for supplying voltage to electronic equipment in battery-operated recording and/or playback apparatus, which voltage is substantially independent of fluctuations in the battery voltage.

In battery-operated recording and/or playback apparatus there is frequently provided a motor having a rotor, the number of revolutions of which is kept substantially constant independent of variations in the battery voltage. The control of the number of revolutions of the motor may be accomplished in various known manners. For example, a centrifugal governor, an electronic device, or a high-frequency control may be used.

Briefly, in accordance with one aspect of the invention, at least certain portions of the electronic apparatus in battery-operated recording or playback apparatus are supplied with voltage derived from the rotor winding of a motor the number of revolutions of which is kept constant. If the number of revolutions of a rotor is kept substantially constant, then the average value of voltage of the rotor winding will be substantially constant. If this voltage is then used as the supply voltage for the electronic equipment, the supply voltage will remain constant regardless of fluctuations in the battery voltage. If desired, of course, one or more filter members may be provided in parallel with the motor winding.

The invention will be described more fully with reference to the drawing wherein.

Figure 1:
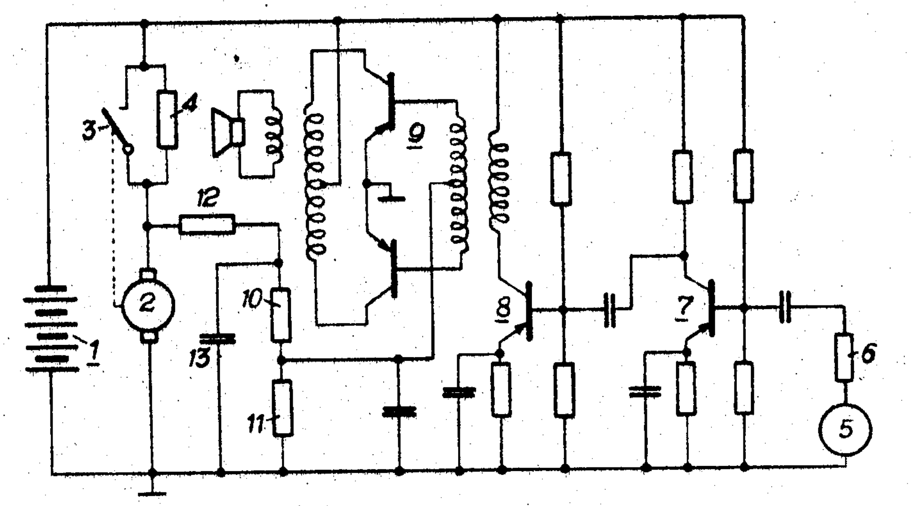
FIG. 1 is a schematic circuit diagram of a portion of a record player.

The battery 1 of FIG. 1 is the primary voltage source for the electrical components of a record player. The turntable (not shown) is driven by means of a motor 2. The number of revolutions of this motor are regulated by means of a centrifugal governor which actuates a contact 3, the latter being included in the current circuit of the motor. A resistor 4 may be connected in parallel with the contact 3 in order to ensure the passage of current through the motor when the contact 3 is open. Motor 2 may be provided with a permanent magnetic stator.

An amplifier which may comprise a preamplifying stage 7, a driving stage 8 and a push-pull final stage 9 is connected to the pick-up 5 through a series resistor 6. The supply voltage for the preamplifying stage 7 and the driving stage 8 is obtained from the battery 1. Between the battery and said stages or between the stages themselves there may be provided a filter (not shown). The collectors of the transistors of the push-pull final stage are also fed directly from the battery 1. The required base-emitter bias voltage for these transistors is obtained, however, from a voltage divider 10, 11, which is connected through a filter member 12, 13, in parallel with the rotor winding of motor 2.

With a decreasing voltage of the battery 1, the centrifugal governor 3 ensures, in a conventional manner, that the number of revolutions of the motor 2, which is substantially directly proportional to the voltage supplied to the rotor winding, is kept at a desired value. This means that with a high battery voltage the contact 3 of the centrifugal governor is open most of the time, whereas with a decreasing battery voltage this contact is closed during gradually longer time intervals, until it remains open and the end of the control-range is attained. Consequently, within the control-range the rotor winding of the motor has a constant average voltage.

In accordance with the invention this voltage of the rotor winding of the motor is utilized for feeding all circuit elements whose properties are highly dependent upon the supplied voltage. In the example of FIG. 1 these are the base-emitter paths of the transistors of the push-pull final stage 9. Variations in value of the base-emitter bias voltage determining the operating point of the transistors in push-pull stages, particularly in Class B stages, is the principal cause of distortion in such circuits. If the supply voltage of the base-emitter paths of the transistors of the final stages remains constant, then the operating point of these transistors will be stable, all other factors remaining the same. In order to achieve this, the constant voltage of the rotor winding of the motor is filtered by the RC-member 12, 13 and is then brought by the voltage divider 10, 11 to the value required for the base-emitter bias voltage. Therefore, there will be substantially no variations in the base-emitter bias voltage of the final stage transistors and no distortion in these stages.

The base-emitter bias voltage for the preamplifying stage 7 and/or the driving stage 8 may, of course, also be derived from the voltage divider 10, 11. The stages 7 and/or 8 may also be fed in common from the rotor winding. This might also be feasible in the final stage, but in this case the contact 3 of the centrifugal governor must be capable of dissipating a considerably greater amount of power.

Figure 2:
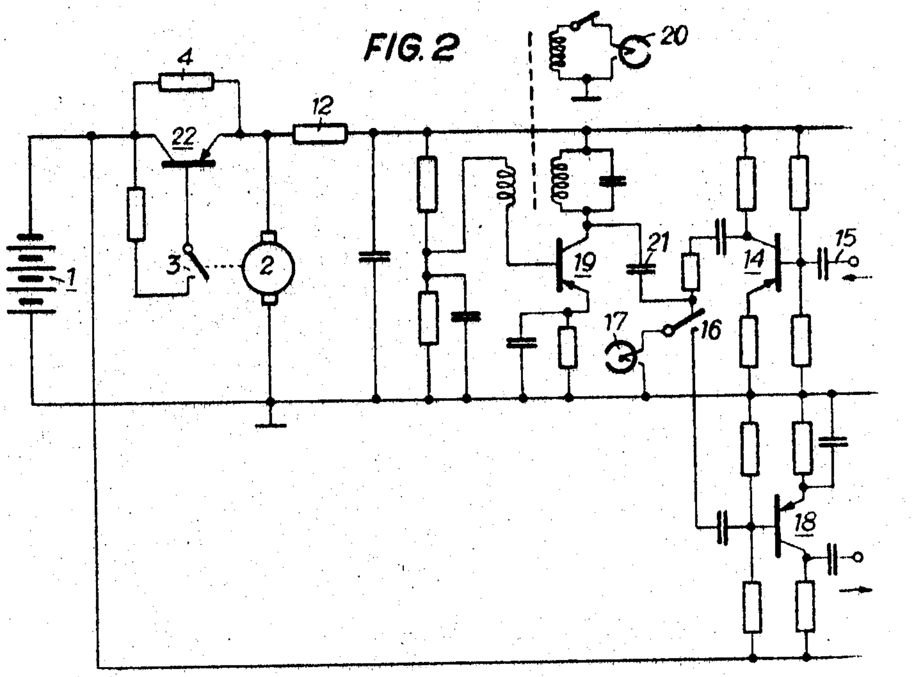
FIG. 2 is a schematic circuit diagram of a magnetic recording and/or playback apparatus; for the sake of simplicity only one stage of the recording amplifier and of the reproducing amplifier are shown.

FIG. 2 shows a circuit arrangement according to the invention for use in a magnetic recording and/or playback apparatus. Reference numeral 14 designates the last stage of the recording amplifier, to which the signal to be recorded is applied through the terminal 15. Through a recording/reproduring switch 16 the magnetic head 17 can be connected for recording to the output of the stage 14 and for reproduction to the input of the first stage 18 of the reproducing amplifier. This switch is shown in FIG. 2 in the recording position. The signal applied by the magnetic head 17 to the input of the first stage of the reproduction amplifier may be derived for example from the collector and be amplified in an amplifier (not shown). There is also provided an oscillator 19, which supplies the energy required for erasing by the erasing head 20, which can be switched off for reproduction, and also the energy required for the high-frequency premagnetisation, which is applied to the recording head for recording through a capacitor 21, for example.

In this embodiment the current circuit of the motor 2 driving the record carrier includes an electronic switch formed by a transistor 22, which is controlled through a contact 3 of a centrifugal governor co-operating with the motor 2. In this way, the number of revolutions of the motor is maintained at a given desired value and the average value of the voltage of the rotor winding is kept constant.

It has been found that the output power of the oscillator 19 varies with a variation in its supply voltage. When this occurs, there may be too little energy for proper premagnetisation. In both cases the record to be made is adversely affected and may even be rendered quite useless, since a record already registered on the carrier would not be completely erased and a record might be registered at too low a level due to the inadequate premagnetisation. With a decrease in supply voltage the level of the record on the carrier would also be adversely affected by the recording amplifier, since with a decreasing supply voltage there is a decrease in amplification.

In reproducing a record the conditions are considerably less critical since the oscillator is not required. A variation in amplification of the reproducing amplifier is much less deleterious, since it is always individually adjusted by means of the volume control.

According to the invention the recording amplifier 14 and the oscillator 19 are connected in parallel with the rotor winding of the motor through an RC-member 12, 13 serving as a filter, so that these parts are fed by the constant voltage of said winding. The influence of the varying battery voltage is thus eliminated. In some cases, it may be sufficient to connect only the oscillator 19 in parallel with the rotor winding of the motor, since the dependence of the recording amplifier upon the supply voltage in such that variations in the latter have a considerably smaller effect. The reproducing amplifier is connected in a conventional manner directly to the battery It is to be understood that the invention is not restricted to the embodiments described above; it may be used with any similar kind of apparatus operating with a stabilized motor voltage and comprising electrical circuit elements, the properties of which depend upon variations of the supply voltage. It is furthermore not restricted to circuitry including transistors and may be employed for example also advantageously in circuitry including low-voltage tubes. In addition, various modifications will readily occur to those skilled in the art without departing from the inventive concept, the scope of which is set forth in the appended claims.

What I claim is:

1. Apparatus for supplying power from a battery having a time-varying output voltage to a transistor network requiring regulated stable DC voltage, comprising a DC motor having a rotor and stator having a substantially constant stator field, means for regulating the rotational speed of said DC motor, an impedance, means for connecting said motor, said battery and said impedance in a loop circuit, whereby the back EMF across the rotor of said DC motor produces a regulated DC voltage, and means for connecting the regulated DC voltage from said motor to said transistor network.

2. Apparatus for supplying power from a battery having a time-varying output voltage to the base-emitter junctions of a transistor network requiring a regulated stable DC voltage comprising, a DC motor having a substantially constant stator field, means for maintaining the rotational speed of said DC motor constant, an impedance, means for connecting said battery, said motor and said impedance in a loop circuit, whereby the back EMF induced in said motor provides a constant DC voltage, and means for connecting said constant voltage from said motor across the base-emitter junctions of said transistor network.

3. Apparatus as claimed in claim 2 further including a filter network connected in parallel with said motor and said transistor network for removing any possible noise signals generated in said motor.

4. A regulated DC power supply for a magnetic recorder comprising, a battery having a time-varying output voltage, a high-frequency oscillator requiring regulated stable DC voltage, a DC motor having a substantially constant stator field, means for maintaining the rotational speed of said motor constant, an impedance, means for connecting said impedance, said battery and said DC motor in a loop circuit, whereby said DC motor provides a constant regulated DC voltage, means for connecting said constant regulated DC voltage from said DC motor to said high-frequency oscillator, a magnetic record carrier driven by said motor, a recording head coacting with said magnetic record carrier, said means for connecting the output of said high-frequency oscillator to said recording head.

References Cited

UNITED STATES PATENTS

| | | | |
|---|---|---|---|
| 3,221,236 | 11/1965 | Scholl | 318—325 |
| 3,317,807 | 5/1967 | Dorfner | 318—325 |
| 3,354,270 | 10/1963 | Smith et al. | 179—100.2 |

BERNARD KONICK, *Primary Examiner.*

H. STECKLER, *Assistant Examiner.*